Dec. 6, 1955 H. M. CRAIN 2,726,048

DRIVE MECHANISM FOR MAGNETIC TAPE RECORDERS

Filed Dec. 13, 1952 2 Sheets-Sheet 1

INVENTOR.
HARRY M. CRAIN
BY
Brown, Critchlow, Flick & Peckham
HIS ATTORNEYS

Dec. 6, 1955 H. M. CRAIN 2,726,048

DRIVE MECHANISM FOR MAGNETIC TAPE RECORDERS

Filed Dec. 13, 1952 2 Sheets-Sheet 2

INVENTOR.
HARRY M. CRAIN
BY
Brown, Critchlow, Flick & Peckham
HIS ATTORNEYS

United States Patent Office 2,726,048

Patented Dec. 6, 1955

2,726,048

DRIVE MECHANISM FOR MAGNETIC TAPE RECORDERS

Harry M. Crain, Philipsburg, Pa., assignor, by mesne assignments, to The Pennsylvania Research Corporation, State College, Pa., a corporation of Pennsylvania Application December 13, 1952, Serial No. 325,823

11 Claims. (Cl. 242—55)

Figure 1:
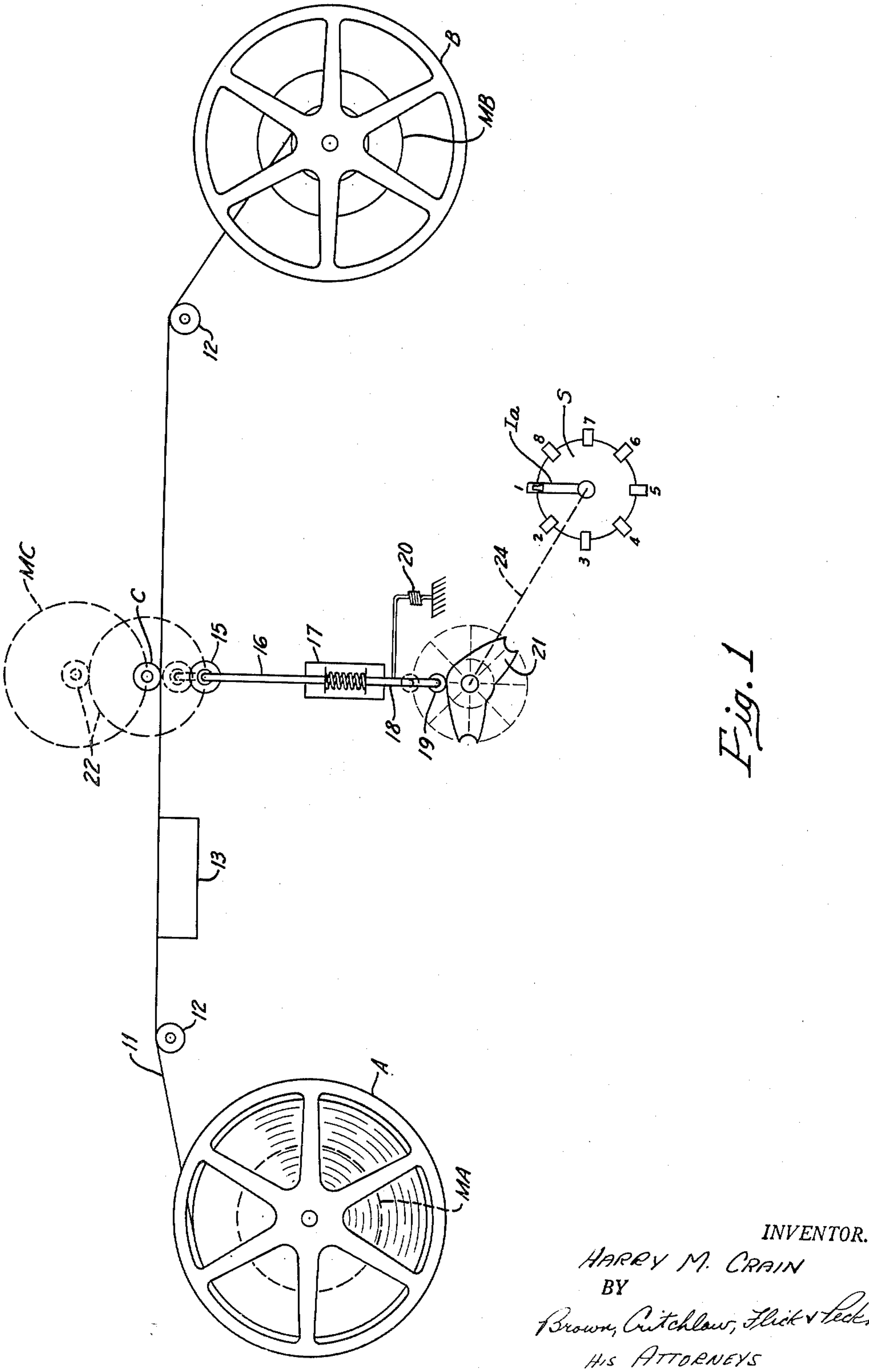

This invention relates to a drive mechanism for magnetic tape recording and reproducing apparatus, in which a long tape of magnetic material, or the like, is wound back and forth between two tape holding reels past an electro-magnetic transducer.

During the recording and playback operations of a tape recorder, it is desirable that the drive mechanism be capable of moving the tape in either direction at a constant speed, for example, fifteen inches per second for high fidelity recording of musical programs. The conventional drive mechanism for that purpose is a rotating capstan, which frictionally engages the tape at some point between the reels. In addition, it is desirable to provide means for rewinding the tape, and for moving it forward to a selected point, at a speed that need not be constant but that should be much faster than the normal recording speed. This has been done by disengaging the capstan from the tape and applying power to one of the reels alone.

In each of the four running conditions mentioned above, the tape holding reels necessarily rotate at different and varying speeds, because of the changing diameter of the tape coiled thereon; and it has accordingly been the practice to drive whichever reel is acting as the take-up reel through a friction clutch, and to apply a friction brake to the other reel (the supply reel) to maintain adequate tension on the tape. Such friction clutches and brakes involve the use of complex mechanical equipment, which is cumbersome and often unreliable in operation and which, because of the constant slippage of the frictional parts, incurs considerable wear and may require frequent adjustment to avoid tape spillage and breakage, particularly when starting and stopping the tape.

It is accordingly among the objects of this invention to provide a drive mechanism for magnetic tape recorders, and the like, that will dispense with the use of friction drives and brakes for the tape holding reels and substitute therefor a positive electrical drive, that will provide dynamic braking of one of the reels to keep the tape under adequate tension during each of the foregoing running conditions and to stop the tape smoothly without spillage or breakage, and that will be simple and inexpensive to manufacture and easy to operate.

Other objects of this invention will appear from the following specification.

In accordance with this invention, the two tape holding reels are connected to separate electric motors adapted to apply a winding torque, when energized, to their respective reels. A rotatable capstan, which can be brought into and out of driving engagement with the tape, is connected to a reversible electric motor. An electrical circuit including the capstan motor and the two reel motors is controlled by a multi-position switch, which has tape running and tape stopping positions. In the tape running positions of the switch, a source of current is connected to the capstan motor and to one of the reel motors for winding the tape on its connected reel; and in the tape stopping positions of the switch, the capstan motor continues to rotate solely from the inertia of its previous rotation in a tape running position and is connected as a generator for supplying the induced current to the other reel motor to cause the latter to apply a winding torque to its connected reel to dynamically brake the system and stop the tape.

Figure 2:
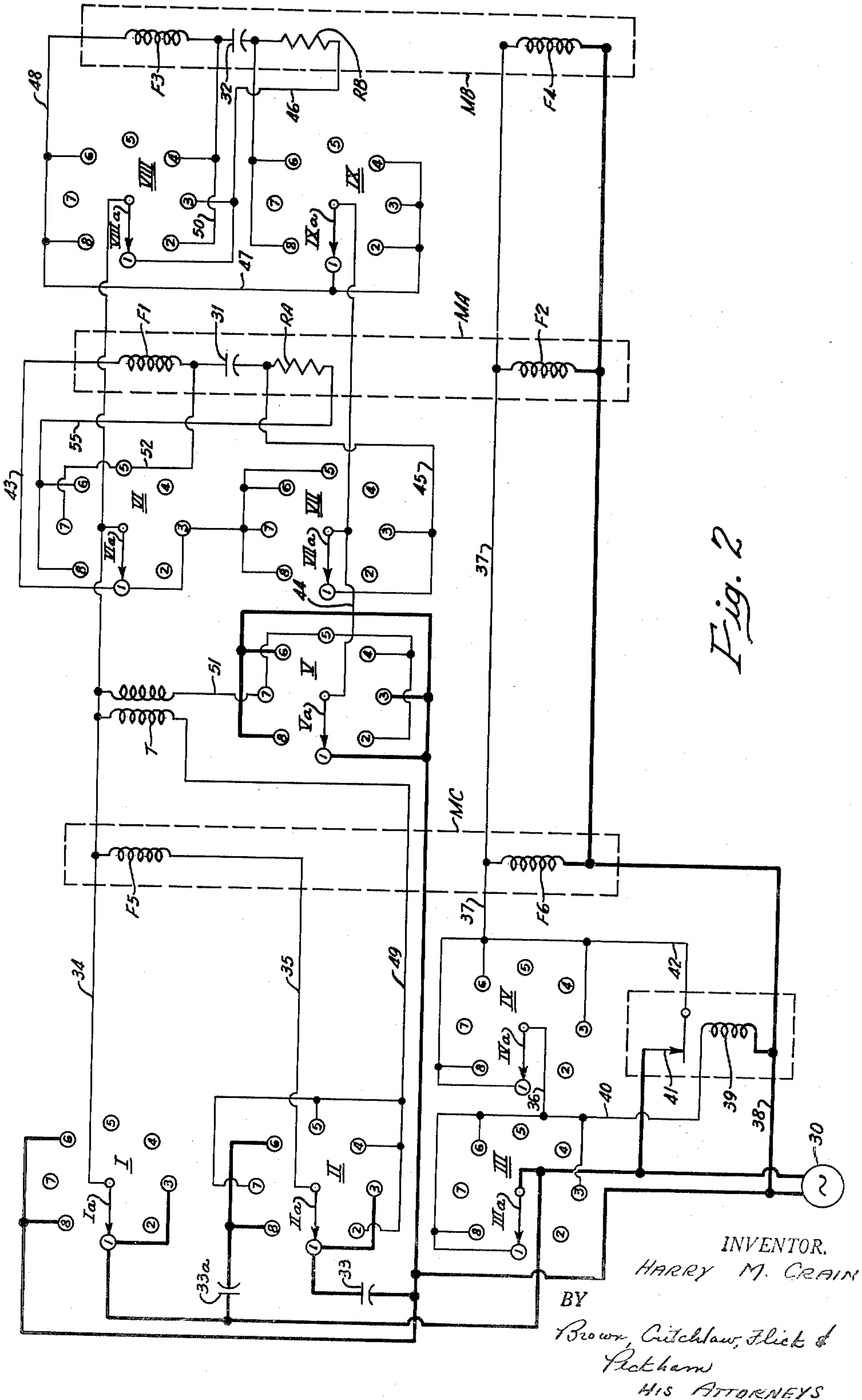

A preferred embodiment of this invention is shown in the accompanying drawings, in which Fig. 1 is a diagrammatic view of a tape recorder embodying this invention; and Fig. 2 is a wiring diagram of the motor circuits therein, controlled by the multi-position switch.

Referring to Fig. 1, a long magnetic tape 11, comprising a long tape coated with magnetic material, or the like, is shown coiled on two tape holding reels A and B. Between those reels, the tape is supported by idlers 12 in operative relation to an electro-magnetic transducer 13, which includes the usual recording, erasing and reproducing heads. The idler-supported portion of the tape also passes between a rotatable capstan C and a pressure idler 15. The latter is mounted on an arm 16, which is connected through a spring coupling 17 to a second arm 18, on the end of which is mounted a cam follower 19 adapted to engage a rotatable cam 21. The arms 16 and 18 are slidably mounted on suitable supports (not shown). In certain positions, the cam 21 urges the pressure idler 15 towards the capstan for drivingly engaging the tape between them; and in other positions, the cam permits the pressure idler to be withdrawn from the tape under the urging of a tension spring 20, so that the tape will freely pass the capstan and be unaffected by its rotation.

The reels A and B are connected to electric motors MA and MB, respectively, which are preferably of the split-phase or capacitator-start type, developing a small but substantially equal torque. The capstan C is connected through a reduction drive 22 to a reversible electric motor MC, which is likewise of the split-phase or capacitator-start type and is preferably also a synchronous motor. Since the capstan motor is intended to control the speed of the tape when the capstan is drivingly engaged therewith, motor MC is designed to have a substantially greater torque than either of the reel motors, so that the capstan controlled tape speed will not be appreciably affected by the pull or drag of the reel motors.

The motor circuits are controlled by a multi-position switch S, which as herein described comprises a nine-pole, eight-throw rotary switch. It may be conveniently made of nine superimposed sections (only a single section I being shown in Fig. 1), each section having eight contacts, numbered 1 to 8, adapted to be successively engaged in eight switch positions by a contact arm (only one of those contacts arms I*a* being shown in Fig. 1). Those arms are mounted on a common shaft 24, on which is also mounted the cam 21. It will be apparent from Fig. 1 that follower 19 and pressure idler 15 will occupy their full line positions (in which the capstan is disengaged from the tape) in six positions of switch S and that in two switch positions (the third and sixth) those elements will occupy their broken line positions (in which the capstan engages the tape).

The circuits controlled by switch S are shown in Fig. 2, wherein the nine sections of the switch are schematically represented and numbered I to IX, each section having contacts, numbered 1 to 8, adapted to be contacted respectively by contact arms I*a*, II*a*, etc., which are shown in their first switch position engaging the first contact of each switch section. The reel motors and the capstan motor are of the split-phase type, and are represented schematically by their two windings: F1 and F2 for motor MA, F3 and F4 for motor MB, and F5 and F6 for motor MC. The upper winding of each motor, as shown in Fig. 2, is associated with one of the three phasing capacitors 31, 32, 33 (or 33a), respectively. A source of alternating current 30 is connected to some of the switch sections by the conductors shown in heavy lines, which are always "hot" regardless of the positions of the contact arms in those sections.

The first switch position of switch S is a counterclockwise winding position, in which the tape is rapidly wound on reel A (rotating counterclockwise); and the capstan, while rotating, is not engaged with the tape.

In this first switch position, current from contact 1 of switch I flows through conductor 34 to the upper terminal of winding F5 of capstan motor MC; and the lower terminal of that same winding receives current from contact 1 of switch section II through conductor 35. Winding F5 is accordingly energized in a circuit containing phasing capacitor 33. The lower winding F6 of motor MC is, in turn, energized by line current (having a 90° phase difference from the current in winding F5) from contact 1 of switch section III through conductor 36, contact arm IVa, and conductor 37 connected to the upper terminal of winding F6, and through conductor 38 connected to its lower terminal. A time delay relay 39 is also energized by current in conductors 38 and 40, so as to close contact 41 and provide an alternate circuit path through conductors 38 and 42 for energizing winding F6, for purposes explained below. According to the convention adopted in this drawing, motor MC, when connected in the manner above described, rotates in a counterclockwise direction and capstan rotates in the opposite direction (due to the reversing effect of the reduction drive 22).

In this same switch position, the upper winding F1 of reel motor MA receives current through conductor 34, contact arm VIa, and conductor 43 connected to the upper terminal of that winding; and also from contact 1 of switch section V through conductors 44, contact arm VIIa, conductor 45, and phasing capacitor 31 connected to the lower terminal of the same winding. The lower winding F2 of motor MA is likewise energized through the same conductors as winding F6 of capstan motor MC, so that motor MA tends to rotate by the same convention in a counterclockwise direction to exert a winding torque on its connected reel A.

Also in the first switch position, the upper winding F3 of reel motor MB receives current through conductor 34, contact arm VIIIa, conductor 46, a resistor RB, and phasing capacitor 32 connected to the lower terminal of winding F3; and also through conductor 44, contact arm IXa, and conductors 47 and 48 connected to the upper terminal of the same winding. The lower winding F4 of motor MB is energized in the same way as the lower windings of the other two motors. Because of the connections to the upper winding F1 of motor MB being reversed over those to winding F1 of motor MA, motor MB tends to rotate in the opposite (clockwise) direction and exerts a winding torque on reel B; but, since one of its windings F1 is in series with the resistor RB, it exerts less winding torque than does motor MA. As a result, the tape is wound on reel A and unwound from reel B against the drag of motor MB, at a speed determined by the difference in the effective winding torques exerted by the two reel motors on their respective reels.

The second switch position of switch S is a stop position, in which (as in all of the stop positions) the kinetic energy stored up by the previously rotating capstan motor MC is used to generate current that is fed to the reel motors in such a way as to brake them dynamically and bring the tape to a smooth stop.

It will be apparent from Fig. 2 that in this second switch position the upper windings of all three motors are disconnected from the source of current 30, but that the lower windings of all three motors remain energized for a limited time in the circuit completed through closed contact 41 of time delay relay 39. Upper winding F5 of capstan motor MC is now connected across the primary of an impedance matching transformer T by conductor 34 on one side; and by conductor 35, contact arm IIa, and conductor 49 on the other side. With only one of its windings excited from an external source, and while it is still rotating from the inertia of its previous rotation, motor MC now acts as a generator supplying current (of different phase from the line current) from its winding F5 to the primary of transformer T. The current thereby induced in the secondary of that transformer is delivered to the upper winding F3 of reel motor MB through conductor 34, contact arm VIIIa, and conductor 50 connected to the lower terminal of that winding; and also through conductor 51, contact arm Va, conductor 44, contact arm IXa, and conductors 47 and 48 connected to the upper terminal of that same winding. As a result, both windings of reel motor MB are now energized, so that it tends to rotate in a clockwise direction and applies a winding torque to reel B, as it did in the first switch position, but with the resistor RB now cut out of the motor circuit so that its torque is not decreased. Motor MB accordingly continues to oppose the winding of the tape on reel A, which is no longer driven except by its own inertia and that of its connected motor MA. The braking action of motor MB acts as a load on the generator-connected motor MC, slowing down the latter and in turn slowing down motor MB until the tape is stopped. The time required for stopping the system after moving switch S from its first to its second switch position should be less than the time delay of relay 39, so that when all of the motors are stopped the relay will open and no current will thereafter flow from current source 30 through any of the motor windings.

With certain motors that can sustain continuous excitation of one winding without damage, the protective feature of the time delay relay is unnecessary. When using such motors, sections III and IV of switch S and time delay relay 39 may be dispensed with, and the lower windings of each motor may be connected directly across the power supply 30, so that current will flow through those windings so long as the power supply is on.

The third switch position is a counter-clockwise recording (or playback) position, in which the tape is wound on a reel A (rotating counter-clockwise) at a speed controlled by capstan C, which drivingly engages the tape. In this switch position, all of the motors are connected in the same circuit arrangement as in the first switch position, since the first and third contacts of each switch section are interconnected. However, capstan C now drivingly engages the tape (the cam 21 having turned so that cam follower 19 and pressure idler 15 are in their broken line positions in Fig. 1); and the capstan controls the speed of translation of the tape past the recording heads, because capstan motor MC develops a substantially greater torque than the reel motors and its speed is not appreciably affected by the relatively small net winding torque exerted by those motors.

The fourth switch position is a stop position, in which the circuit connections are the same as in the second switch position. Motor MC again acts as a generator to provide dynamic braking of the motor system, as previously explained, with the capstan no longer engaging the tape.

The fifth switch position is also a stop position, which is either passed over momentarily and without effect in going from the fourth switch position (also a stop position) to the sixth switch position (a running position), or is occupied effectively to stop the system in going from the sixth switch position to the third switch position (also a running position). It is necessary to have these two adjacent stop positions, because in the adjacent running positions the tape is moving in different directions and different circuit arrangements are required to brake the system. Since the fifth switch position produces the same circuit configuration as the seventh, the circuit connections in both of those positions will be explained after discussing the sixth switch position.

The sixth switch position is a clockwise recording (or playback) position, in which the tape is wound on reel B (rotating clockwise) at a speed controlled by capstan C, which drivingly engages the tape. In this switch position, the connections between the upper winding F5 of capstan motor MC and the source of current 30 are the reverse of those in the first and third switch positions, i. e., the upper side of that current source (instead of the lower side) is now connected through a phasing capacitator 33*a*, contact arm II*a*, and conductor 35 to the lower terminal of winding F5, and the upper terminal of that winding is connected through conductor 34 and contact arm I*a* to the lower (instead of the upper) side of the current source. As a result, motor MC now rotates in the opposite, or clockwise, direction, and the capstan rotates in a counter-clockwise direction to translate the tape toward reel B. Motors MA and MB are connected in the circuit so that they tend to rotate in the same direction (counter-clockwise) as in the first and third switch positions and to apply a winding torque to their connected reels. However, current is now supplied to winding F1 of motor MA through a resistor RA, and resistor RB is no longer connected in series with winding F3 of motor MB. Accordingly motor MA now develops less winding torque than does motor MB, so that reel B now acts as the take-up reel and reel A as the supply reel, and the tape is wound on reel B against the drag of motor MA.

The seventh switch position, as previously stated, is a stop position (as is the fifth switch position, which produces the same circuit configuration). Motor MC again acts as a generator for dynamically braking the rotating elements of the system. The induced current in winding F5 of that motor is again supplied to the primary of transformer T, and current from the secondary of that transformer excites winding F1 of motor MA through conductor 34, contact arm VI*a*, and conductor 52 connected to the lower terminal of that winding; and also through conductor 51, contact arm V*a*, conductor 44, contact arm VII*a*, and conductor 43 connected to the upper terminal of the same winding. The resistor RA, however, is now cut out of this motor circuit, so as not to decrease the torque of motor MA, which is applied in a counter-clockwise direction to oppose the continued winding of the tape on reel B.

The eighth switch position is a clockwise winding position, in which the tape is wound at high speed on reel B. The circuit configuration is the same as in the sixth switch position (contacts 6 and 8 of the various switch sections being interconnected), but the capstan is now disengaged from the tape.

The operating conditions in each of the eight switch positions described above may be summarized as follows.

In the tape recording positions of the switch (when the capstan engages the tape), the source of current is connected directly to the capstan motor and to the take-up reel motor and, through the resistor, to the supply reel motor, so that each reel motor applies a winding torque to its connected reel and the capstan motor drives the tensioned tape at a constant speed in the same direction as it tends to be wound by the difference in torque between the reel motors.

In the tape winding positions of the switch (when the capstan is disengaged from the tape), the circuit connections are the same as in the tape recording positions, so that the capstan motor rotates under no load and the tape is wound under tension on the take-up reel at a speed determined by the difference in torque between the two reel motors.

In the tape stopping positions of the switch (when the capstan is also disengaged from the tape), the capstan motor is connected as a generator in the supply reel motor circuit, converting the stored kinetic energy of its previous rotation into electrical energy that is delivered to the supply reel motor for dynamically braking the system and bringing the tape to a smooth stop.

The same operating conditions are condensed in the following table, in which the direction of rotation referred to in each switch position is the direction of rotation of the reels in Fig. 1.

| Switch Position | Operating Condition |
|---|---|
| 1 | Winding counter-clockwise (fast). |
| 2 | Stop (after counter-clockwise rotation). |
| 3 | Recording counter-clockwise (slow). |
| 4 | Stop (after counter-clockwise rotation). |
| 5 | Stop (after clockwise rotation). |
| 6 | Recording clockwise (slow). |
| 7 | Stop (after clockwise rotation). |
| 8 | Winding clockwise (fast). |

A mechanical stop (not shown) is desirably placed between the first and the eighth switch positions to avoid the necessity of interposing two additional stop positions. In other words, switch S can be rotated counter-clockwise from the first to the eighth switch position, and must then be rotated clockwise to return it to the first switch position. It will be noted that the various stop positions are equally effective in stopping the system on the retrograde movement of the switch as they are in its progressive movement, described in detail above. For example, the fifth and seventh switch positions (stop positions) are each adjacent to running positions in which the reels are rotating in a clockwise direction. Similarly, the second and fourth switch positions (also stop positions) are each adjacent to running positions in which the reels are rotating in a counter-clockwise direction. The various stop positions are arranged for operating convenience and to prevent possible damage to the tape, which could result if the switch S were moved directly, for example, from the fast winding first switch position to the slow recording third switch position. Without a stop position between those running positions, there would be considerable difference between the tape speed and the peripheral speed of the capstan at the moment it engaged the tape in the third switch position, and the tape would likely be damaged.

It will be apparent from the foregoing description that the capstan motor MC must have sufficient torque to develop a tape translating force through the reduction drive 22 and capstan C (when the capstan drivingly engages the tape) to translate the tape at a speed that is not perceptibly affected by the tension on the tape produced by the pull or drag of the reel motors. Capstan motor MC should also have sufficient electrical capacity as a generator and sufficient momentum, while it is running down in the various stop positions, to bring the reel motors to a stop before stopping itself.

While the embodiment of the invention herein described has been limited to motors of the split-phase type, it should be understood that the principles of this invention are equally applicable to other alternating current motors and to modifications of the circuits shown in Fig. 2. One such modification, involving the elimination of the time delay relay 39 and its associated switch sections III and IV, has already been discussed. As a further modification, the impedance matching transformer T (and its associated switch section V) can be eliminated whenever the electrical matching between the capstan motor MC and the rest of the system is sufficiently close by design to obtain adequate dynamic braking.

A still further modification permits the elimination of resistors RA and RB when the electrical self-losses of the reel motors MA and MB are sufficiently large to produce adequate drag on the tape as it is unwound from the reel connected to one of those motors. For example, with suitably designed reel motors MA and MB, the resistors RA and RB may be cut out of the circuit in Fig. 2 by disconnecting conductor 55 from contacts 6 and 8 of switch section VI and also disconnecting conductor 46 from contacts 1 and 3 of switch section VIII. As a result, in the first and third switch positions, the source of current will be disconnected from the upper winding F3 of motor MB; and in the sixth and eighth switch positions, the source of current will likewise be disconnected from the upper windings F1 of motor MA. Accordingly, in the first and third switch positions (when reel B acts as the supply reel), motor MB will receive current from the source 30 only in its lower winding F4. However, as the tape is unwound from reel B causing motor MB to rotate with only one of its windings excited, eddy current losses will be manifested as dynamic braking or drag. The same result will be produced in motor MA in the sixth and eighth switch positions (when reel A acts as the supply reel).

It will be obvious that with certain types of reel motors MA and MB, particularly if they are connected to their respective reels through gearing, there may be sufficient mechanical friction to provide adequate drag on the supply reel without having the supply reel motor connected to a source of current in the tape winding and tape recording positions of the switch.

Reel motors MA and MB may be reversible motors (they are so shown in Fig. 2). However, since they apply only a winding torque to their connected reels, they may be non-reversible, provided they are connected in such a way in the circuit or to their respective reels that they will always apply a winding torque thereto when energized.

Among the advantages of the driving mechanism herein described is that it provides for direct driving of the tape holding reels without the interposition of mechanical friction clutches and provides for dynamic braking of the system without the use of friction brakes, thereby avoiding the use of complex mechanical equipment and the inconveniences of tape spillage or breakage frequently attending the use of presently available friction drives. A further advantage of this drive mechanism is its flexibility and the relative simplicity of its operating parts.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A drive mechanism for use in a magnetic tape recorder having two tape holding reels and a rotatable capstan for drivingly engaging the tape between the reels, comprising separate reversible electric motors including a reversible capstan motor having a plurality of electrical windings that is connected to the capstan and two reel motors each connected to different reels for applying a winding torque to those reels, a source of electric current, an electrical circuit including the capstan motor and the two reel motors, a multi-position switch associated with that circuit and having tape running and tape stopping positions, said switch in its tape running positions connecting the source of current to both windings of the capstan motor for rotating it and to one of the reel motors for winding the tape on its connected reel, and said switch in its tape stopping position connecting the source of current to one of the windings of the capstan motor and connecting a second winding of the capstan motor to the other reel motor, whereby the capstan motor will continue to rotate from the inertia of its previous rotation and will act as a generator to supply an induced current to said other reel motor that will cause it to apply a winding torque to its connected reel to stop the tape.

2. A drive mechanism for use in a magnetic tape recorder having two tape holding reels, adapted to act interchangeably as a supply reel and a take-up reel, and a rotatable capstan for drivingly engaging the tape between the reels, said mechanism comprising separate electric motors having a plurality of electrical windings including a reversible capstan motor connected to the capstan and two reel motors each connected to a different reel for applying a winding torque to those reels, a source of electric current, an electrical circuit including the capstan motor and the two reel motors, a multi-position switch associated with that circuit and having tape running and tape stopping positions, said switch in its tape running positions connecting the source of current to both windings of the capstan motor and to both windings of the reel motor connected to the take-up reel for rotating both of said motors in a direction that will wind the tape on the take-up reel, and said switch in its tape stopping positions connecting the source of current to one winding of the capstan motor and to one winding of the supply reel motor and interconnecting a second winding of the capstan and supply reel motors, whereby the capstan motor will rotate from the inertia of its previous rotation and will induce a current in its second winding that will cause the supply reel motor to apply a winding torque to the supply reel to stop the tape.

3. A drive mechanism for use in a magnetic tape recorder having two tape holding reels adapted to act interchangeably as a supply reel and a take-up reel and a rotatable capstan for drivingly engaging the tape between the reels, said mechanism comprising separate electric motors having a plurality of electrical windings including a reversible capstan motor connected to the capstan and two reel motors each connected to a different reel for applying a winding torque to those reels, a source of electric current, an electrical circuit including the capstan motor and the two reel motors, a multi-position switch associated with that circuit and having tape running and tape stopping positions, said switch in its tape running positions connecting the source of current to both windings of the capstan motor and to both windings of the take-up reel motor and to one of the windings of the supply reel motor, whereby the tape will be wound on the take-up reel against the drag of the supply reel motor, and said switch in its tape stopping positions connecting the source of current to one winding only of the capstan motor, and to one winding only of the supply reel motor and interconnecting a second winding of the capstan and supply reel motors, whereby the capstan motor will rotate from the inertia of its previous rotation and will induce a current in its second winding that will cause the supply reel motor to apply a winding torque to the supply reel to stop the tape.

4. A drive mechanism according to claim 3 that includes the additional element of a time delay relay connected between the source of current and one of the windings of each of said motors for disconnecting the source of current from said windings a predetermined time after the switch assumes only one of its tape stopping positions.

5. A drive mechanism for use in a magnetic tape recorder having two tape holding reels adapted to act interchangeably as a supply reel and a take-up reel and having a rotatable capstan adapted to frictionally engage the tape between the reels, comprising three electric motors including a reversible capstan motor for driving the capstan and two reel motors each connected to a different reel for applying a winding torque thereto, a resistor adapted to be connected in series with the reel motor connected to the supply reel for decreasing its torque below that of the other reel motor, the capstan motor having sufficient capacity to develop an effective tape translating force through the capstan substantially greater than the tape translating force exerted by the net winding torques of the two reel motors, so that the capstan motor alone will control the speed of translation of the tape between the reels when the capstan is in driving engagement with the tape, a source of electric current, an electrical circuit including the capstan and reel motors, a multi-position switch associated with that circuit having tape running and tape stopping positions, said switch in its tape running positions connecting the source of current directly to the capstan motor and to the take-up reel motor and connecting the source of current to the supply reel motor in series with the resistor, so that each reel motor applies a winding torque to its connected reel and the tape will be wound on the take-up reel against the drag of the supply reel motor, and said switch in its tape stopping positions connecting the capstan motor while it is still rotating from the inertia of its previous rotation, as a generator to the supply reel motor for supplying an induced current to the supply reel motor that will cause it to apply a winding torque to the supply reel to stop the tape.

6. A drive mechanism according to claim 4, including the additional element of a tape engaging means for bringing the capstan into driving engagement with the tape in some of the tape running positions of the switch and for disengaging the tape from the capstan in the tape stopping positions of the switch.

7. A drive mechanism according to claim 5, in which said tape engaging means includes a pressure idler, and cam means operatively associated with the switch for forcing the pressure idler towards the capstan for drivingly engaging the tape between the capstan and idler.

8. A drive mechanism for use in a magnetic tape recorder having two tape holding reels adapted to act interchangeably as a supply reel and a take-up reel and having a rotatable capstan adapted to be brought into and out of driving engagement with the tape between the reels, said mechanism comprising three electric motors of the split-phase type having two electrical windings adapted to be energized by different phases of alternating current; said motors including a reversible capstan motor connected to the capstan, a supply reel motor connected to the supply reel, and a take-up reel motor connected to the take-up reel; the capstan motor having substantially greater electrical capacity than either of the reel motors, so that the capstan motor alone will control the speed of translation of the tape between the reels when the capstan is in driving engagement with the tape; a source of alternating electrical current; a resistor; an electrical circuit including the capstan and reel motors; a multi-position switch associated with that circuit having tape recording, tape winding, and tape stopping positions; tape engaging means operatively associated with the switch, for drivingly engaging the capstan with the tape in the tape recording positions of the switch and for disengaging the capstan from the tape in the tape winding and tape stopping positions of the switch; said switch in its tape recording positions connecting the source of current to both windings of the capstan and take-up reel motors and connecting the source of current through the resistor to both windings of the supply reel motors, so that each reel motor will apply a winding torque to its connected reel and the capstan will drive the tape towards the take-up reel, whereby the tape will be wound on the take-up reel at a speed controlled by the capstan motor with that portion of the tape between the supply reel and the capstan being under tension produced by the drag of the supply reel motor;

said switch in its tape winding positions making the same circuit connections as in its tape recording positions, whereby the tape will be wound on the take-up reel under tension produced by the drag of the supply reel motor at a winding speed determined by the difference in torque developed by the two reel motors; said switch in its tape stopping positions connecting the source of current to one winding of the capstan and supply reel motors and electrically connecting the other winding of the capstan motor with the other winding of the supply reel motor, whereby the continued rotation of the capstan motor due to the inertia of its previous rotation will induce a current in said other winding of the capstan motor to cause the supply reel motor to apply a winding torque to its connected reel to dynamically brake the system.

9. A drive mechanism for use in a magnetic tape recorder having two tape holding reels and a rotatable capstan for drivingly engaging the tape between the reels, comprising separate electric motors including a capstan motor having a plurality of electrical windings that is connected to the capstan and two reel motors each connected to different reels for applying a winding torque to those reels, a source of electric current, an electrical circuit including the capstan motor and the two reel motors, a multi-position switch associated with that circuit and having tape running and tape stopping positions, said switch in its tape running positions connecting the source of current to the windings of the capstan motor and to one of the reel motors for winding the tape on its connected reel, and said switch in its tape stopping positions connecting the source of current to one of the windings of the capstan motor and connecting a second winding of the capstan motor to the other reel motor while the capstan motor is still rotating from the inertia of its previous rotation in a tape running position, the capstan motor thereby acting as a generator for supplying an induced current to said other reel motor that will cause the latter to apply a winding torque to its connected reel to stop the tape.

10. A drive mechanism according to claim 9, in which said switch in its tape stopping positions connects the capstan motor as a generator to the other reel motor through an impedance matching transformer.

11. A drive mechanism according to claim 9 that includes the additional elements of tape engaging means for bringing the tape into driving engagement with the capstan in at least one of the tape running positions of the switch and for disengaging the tape from the capstan in the tape stopping positions of the switch.

References Cited in the file of this patent

UNITED STATES PATENTS

| | | |
|---|---|---|
| 1,848,663 | Robinson, Jr. | Mar. 8, 1932 |
| 2,214,617 | Kenyon | Sept. 10, 1940 |
| 2,487,476 | Pratt et al. | Nov. 8, 1949 |
| 2,497,142 | Shepherd | Feb. 14, 1950 |

FOREIGN PATENTS

| | | |
|---|---|---|
| 942,590 | France | Sept. 20, 1948 |